(12) United States Patent
Jentzsch et al.

(10) Patent No.: US 12,555,980 B2
(45) Date of Patent: Feb. 17, 2026

(54) OPTOELECTRONIC SEMICONDUCTOR LASER COMPONENT AND OPTOELECTRONIC ARRANGEMENT

(71) Applicant: ams-OSRAM International GmbH, Regensburg (DE)

(72) Inventors: Bruno Jentzsch, Regensburg (DE); Hubert Halbritter, Dietfurt (DE)

(73) Assignee: ams-OSRAM International GmbH, Regensburg (DE)

( * ) Notice: Subject to any disclaimer, the term of this patent is extended or adjusted under 35 U.S.C. 154(b) by 712 days.

(21) Appl. No.: 17/910,005

(22) PCT Filed: Feb. 23, 2021

(86) PCT No.: PCT/EP2021/054423
§ 371 (c)(1),
(2) Date: Sep. 8, 2022

(87) PCT Pub. No.: WO2021/180461
PCT Pub. Date: Sep. 16, 2021

(65) Prior Publication Data
US 2023/0101630 A1 Mar. 30, 2023

(30) Foreign Application Priority Data
Mar. 11, 2020 (DE) .................... 10 2020 106 638.4

(51) Int. Cl.
*H01S 5/42* (2006.01)
*H01S 5/14* (2006.01)
(Continued)

(52) U.S. Cl.
CPC .............. *H01S 5/423* (2013.01); *H01S 5/142* (2013.01); *H01S 5/18369* (2013.01); *H01S 5/4087* (2013.01)

(58) Field of Classification Search
None
See application file for complete search history.

(56) References Cited

U.S. PATENT DOCUMENTS 3,996,492 A    12/1976  Mcgroddy
4,216,485 A *   8/1980  Page .................... H10F 55/255
                                                    257/85
(Continued)

FOREIGN PATENT DOCUMENTS

DE    102008014092 A1    7/2009
DE    102009004117 A1    7/2010
(Continued)

OTHER PUBLICATIONS

International Search Report issued for the corresponding international application No. PCT/EP2021/054423, dated Jun. 10, 2021, 6 pages (for informational purposes only).

(Continued)

*Primary Examiner* — Jessica S Manno
(74) *Attorney, Agent, or Firm* — Viering, Jentschura & Partner mbB

(57) ABSTRACT

An optoelectronic semiconductor laser component may include at least two laser units. The semiconductor laser component may have an output coupling surface configured to generate electromagnetic radiation in the semiconductor laser component. Each laser unit may include a laser resonator having a resonator axis, an output coupling mirror and a first and a second resonator mirror with a primary section of the resonator axis running laterally therebetween. The output coupling mirror may be formed by a partial region of the output coupling surface. Along the primary section of the resonator axis at least one contact strip is arranged on the output coupling surface, and extends to a metallic connection surface. The laser units may be aligned in such a way (Continued)

that the primary sections of the resonator axes run parallel to one another and the output coupling mirrors face one another.

19 Claims, 4 Drawing Sheets

(51) Int. Cl.
    *H01S 5/183* (2006.01)
    *H01S 5/40* (2006.01)

(56) References Cited

U.S. PATENT DOCUMENTS

| | | | | |
|---|---|---|---|---|
| 4,633,476 A | * | 12/1986 | Scifres | B82Y 20/00 |
| | | | | 372/50.1 |
| 4,881,237 A | | 11/1989 | Donnelly | |
| 4,956,844 A | * | 9/1990 | Goodhue | H01S 5/42 |
| | | | | 372/99 |
| 5,060,237 A | | 10/1991 | Peterson | |
| 5,253,263 A | | 10/1993 | Jansen et al. | |
| 8,442,084 B2 | * | 5/2013 | Ungar | H01S 5/18 |
| | | | | 372/50.1 |
| 8,811,448 B2 | * | 8/2014 | Illek | H01S 5/041 |
| | | | | 372/70 |
| 2008/0063021 A1 | | 3/2008 | Seo | |
| 2010/0316076 A1 | | 12/2010 | Behfar et al. | |
| 2016/0087399 A1 | | 3/2016 | Horn et al. | |
| 2021/0006033 A1 | | 1/2021 | Jentzsch et al. | |

FOREIGN PATENT DOCUMENTS

| | | |
|---|---|---|
| DE | 102010047451 A1 | 4/2012 |
| DE | 102013104728 A1 | 11/2014 |
| DE | 102018105080 A1 | 9/2019 |
| JP | H01186690 A | 7/1989 |
| JP | H06104535 A | 4/1994 |

OTHER PUBLICATIONS

German Search Report issued for the corresponding German Patent Application No. 10 2020 106 638.4, dated Nov. 3, 2020, 5 pages (for informational purposes only).

German Search Report issued for the corresponding German Patent Application No. 11 2021 001 601.6, dated Apr. 16, 2024, 5 pages (for informational purposes only).

* cited by examiner

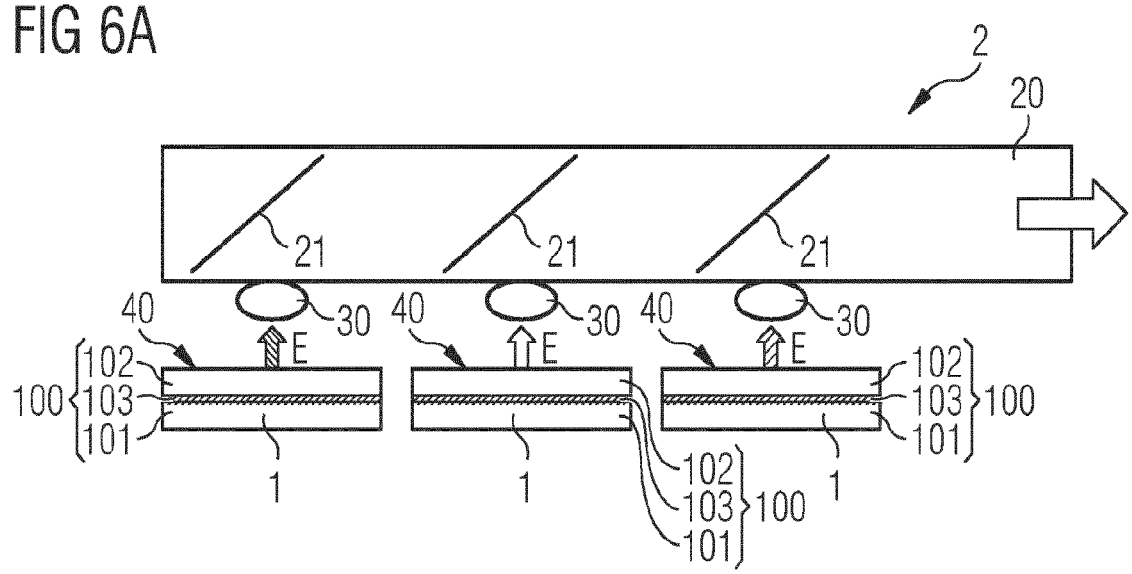
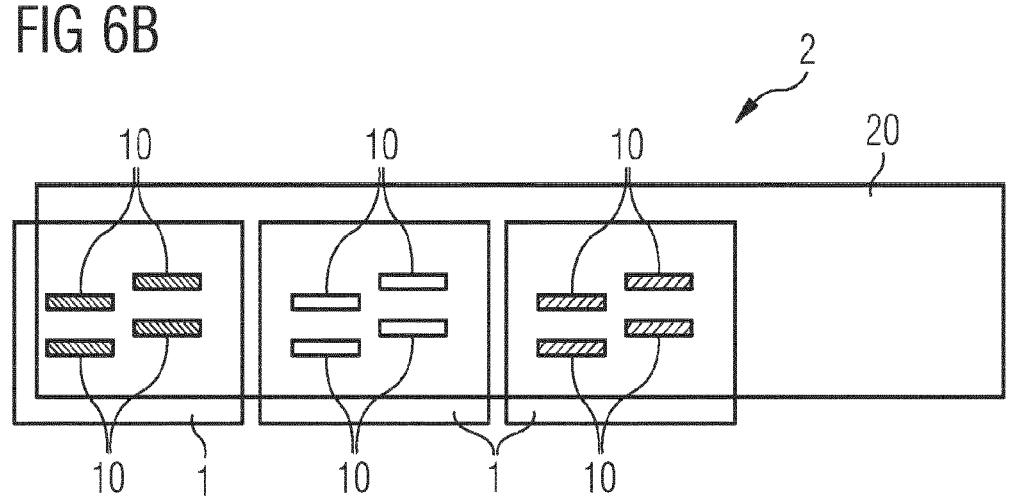

OPTOELECTRONIC SEMICONDUCTOR LASER COMPONENT AND OPTOELECTRONIC ARRANGEMENT

CROSS-REFERENCE TO RELATED APPLICATIONS

The present application is a national stage entry according to 35 U.S.C. § 371 of PCT application No.: PCT/EP2021/054423 filed on Feb. 23, 2021; which claims priority to German patent application DE 10 2020 106 638.4, filed on Mar. 11, 2020; all of which are incorporated herein by reference in their entirety and for all purposes.

TECHNICAL FIELD

An optoelectronic semiconductor laser component and an optoelectronic arrangement are specified. The optoelectronic semiconductor laser component and the optoelectronic arrangement are configured in particular for generating electromagnetic radiation, for example light perceptible to the human eye.

BACKGROUND

One objective to be achieved consists in specifying an optoelectronic semiconductor laser component which has an improved efficiency.

A further objective to be achieved consists in specifying an optoelectronic arrangement which has a simplified construction.

SUMMARY

The semiconductor laser component can be provided for emitting coherent electromagnetic radiation or can alternatively be operated as a superluminescence diode.

In accordance with at least one embodiment, the optoelectronic semiconductor laser component comprises at least two laser units. Each laser unit is provided for emitting coherent or partly coherent electromagnetic radiation. In particular, the electromagnetic radiation emitted by the laser units of a semiconductor laser component has an identical peak wavelength. The peak wavelength of an electromagnetic emission spectrum is for example the wavelength at which the spectrum has a global maximum.

In accordance with at least one embodiment, the optoelectronic semiconductor laser component has an output coupling surface, through which electromagnetic radiation generated in the semiconductor laser component during operation is coupled out at least regionally. In particular, the output coupling surface is a main surface of the semiconductor laser component.

In accordance with at least one embodiment of the optoelectronic semiconductor laser component, each laser unit comprises a laser resonator having a resonator axis, an output coupling mirror, a first resonator mirror and a second resonator mirror. The resonator axis has a primary section running laterally between the first resonator mirror and the second resonator mirror. Here and hereinafter, laterally means a direction aligned parallel or substantially parallel to the main direction of extent of the semiconductor laser component.

Furthermore, the resonator axis has a secondary section running vertically between the first resonator mirror and the output coupling mirror. Here and hereinafter, vertically means a direction aligned parallel or substantially parallel to a stacking direction of the semiconductor laser component and in particular transversely, such as perpendicularly, with respect to the lateral direction.

The output coupling mirror may have a low optical reflectivity for the electromagnetic radiation emitted in the laser unit during operation. The output coupling mirror is provided for coupling out part of the electromagnetic radiation circulating in the laser resonator. For the case where the semiconductor laser component is operated as a superluminescence diode, the output coupling mirror is antireflective for example to a greater extent than in the case of a component operated as a laser.

In accordance with at least one embodiment of the optoelectronic semiconductor laser component, the output coupling mirror is formed by a partial region of the output coupling surface. In other words, the output coupling mirror is defined by a portion from the output coupling surface. By way of example, Fresnel reflection that occurs at the output coupling surface is sufficient to provide a sufficiently high reflectivity. However, that does not mean that the output coupling mirror is formed exclusively by a part of the output coupling surface. In particular, the output coupling mirror has an optical antireflection layer arranged on the output coupling surface.

In accordance with at least one embodiment of the optoelectronic semiconductor laser component, along the primary section of the resonator axis a contact strip is arranged on the output coupling surface. In particular, the contact strip is formed by a metal. By way of example, an electrical connection of a laser unit is in each case effected by means of the contact strip. The contact strip extends to a metallic connection surface. The contact strip may not cover the output coupling mirror. The metallic connection surface forms a bond pad, for example, and furthermore serves for the electrical connection of the contact strip.

In accordance with at least one embodiment of the optoelectronic semiconductor laser component, the primary sections of the resonator axes of the laser units run parallel to one another and the laser units are aligned in such a way that their output coupling mirrors face one another. Here and hereinafter, face one another means that, in relation to a common axis along which the output coupling mirrors are arranged, the laser units are arranged in such a way that the output coupling mirrors of all the laser units are arranged in each case near the axis and the second resonator mirrors of the laser units are arranged in each case far from the axis.

In accordance with at least one embodiment, the optoelectronic semiconductor laser component comprises at least two laser units, wherein
- the semiconductor laser component has an output coupling surface, through which electromagnetic radiation generated in the semiconductor laser component during operation is coupled out at least regionally,
- each laser unit comprises a laser resonator having a resonator axis, an output coupling mirror and a first and a second resonator mirror, wherein a primary section of the resonator axis runs laterally between the first and second resonator mirrors, and a secondary section of the resonator axis runs vertically between the first resonator mirror and the output coupling mirror,
- the output coupling mirror is formed by a partial region of the output coupling surface,
- along the primary section of the resonator axis at least one contact strip is arranged on the output coupling surface, and extends to a metallic connection surface, and the laser units are aligned in such a way that the primary sections of the resonator axes run parallel to one another and the output coupling mirrors face one another.

An optoelectronic semiconductor laser component described here is based on the following considerations, inter alia: in order to produce pixelated light sources for a projection application, stringent requirements are made in respect of the brightness and the resolution of the light source. The requirements in respect of the brightness are satisfied by edge emitting laser diodes, for example, which however can be arranged at a small distance from one another only with difficulty owing to the design. An achievable resolution is limited as a result. In order to increase the resolution, a combination of the edge emitting laser diodes with a deflection mirror unit is possible, although that can necessitate extensive adjustment.

The optoelectronic semiconductor laser component described here makes use of the concept, inter alia, of using a surface emitting edge emitter comprising a plurality of laser units and resonator mirrors integrated therein. A particularly small distance between the laser units is thus attainable. The small distance between the laser units enables in particular a high resolution with at the same time high brightness. The use of an external deflection mirror unit can advantageously be obviated. Simplified mounting of the semiconductor laser component is thus possible. Furthermore, such a semiconductor laser component is producible particularly cost-effectively and compactly.

In accordance with at least one embodiment of the optoelectronic semiconductor laser component, the second resonator mirror is aligned vertically at an end surface of the laser units and is an end mirror of the laser resonator. In other words, the end mirror is embodied by a vertical facet of the semiconductor laser component.

The end mirror has in particular a high optical reflectivity for the electromagnetic radiation emitted in the laser unit during operation. By way of example, the end mirror has a reflectivity of at least 95%, such as at least 99%. For the case where the semiconductor laser component is operated as a superluminescence diode, the end mirror is antireflective, for example, and thus has a lower reflectivity than in the case of a component operated as a laser.

In accordance with at least one embodiment of the optoelectronic semiconductor laser component, the second resonator mirror is a deflection mirror and an end mirror is embodied on the output coupling surface, wherein a further secondary section of the resonator axis runs between the second resonator mirror and the end mirror. The second resonator mirror is arranged in particular in such a way that it deflects electromagnetic radiation from the primary resonator axis to the end mirror, and vice versa.

Electromagnetic radiation thus propagates for example between the end mirror and the output coupling mirror and is deflected in each case by the first resonator mirror and the second resonator mirror. The first resonator mirror and the second resonator mirror have in particular a reflectivity of at least 99% for the electromagnetic radiation emitted in the laser unit during operation. The resonator axis is folded by means of the resonator mirrors. A folded resonator axis advantageously offers a higher number of degrees of freedom in the design of the semiconductor laser component and thus enables output coupling and amplification of the laser component to be defined independently of one another to the greatest possible extent.

In accordance with at least one embodiment of the optoelectronic semiconductor laser component, at least one of the contact strips extends over the end mirror to the metallic connection surface. This enables a particularly high design flexibility for the arrangement of the contact strips.

In accordance with at least one embodiment of the optoelectronic semiconductor laser component, all the contact strips extend over the end mirror to the metallic connection surface. In other words, all the contact strips of each laser unit extend over the end mirror of the respective laser unit. Advantageously, therefore, in a lateral direction there is enough space available on the output coupling surface to allow the contact strips to be provided with connection surfaces and electrically contacted therewith.

In accordance with at least one embodiment of the optoelectronic semiconductor laser component, the end mirror comprises a multilayered dielectric mirror. In a non-limiting embodiment, the end mirror is a distributed Bragg reflector (DBR). In particular, the end mirror comprises a plurality of alternating layers having a varying refractive index and is distinguished by a particularly high reflectivity in a narrow range of the electromagnetic spectrum.

In accordance with at least one embodiment of the optoelectronic semiconductor laser component, the first and second resonator mirrors each have an alignment with the primary section of the resonator axis which enables a total internal reflection of the electromagnetic radiation amplified in the laser resonator in the direction of the output coupling surface. The first and second resonator mirrors are oriented in particular in each case at an angle of 45° with respect to the primary section of the laser resonator. Use of total internal reflection advantageously results in particularly low-loss deflection of the electromagnetic radiation from the secondary sections of the resonator axis and the primary section of the resonator axis.

In accordance with at least one embodiment of the optoelectronic semiconductor laser component, in each case two laser units are arranged in such a way that the primary sections of their resonator axes lie on a common output coupling row. In other words, the laser units are arranged in such a way that the output coupling row forms an axis of mirror symmetry of the laser units. The output coupling mirrors of the laser units are thus advantageously arranged at a particularly small distance from one another. A small distance enables a high pixel density and facilitates superimposition of the electromagnetic radiation of the laser units in order to increase the brightness of a pixel.

In accordance with at least one embodiment of the optoelectronic semiconductor laser component, the laser units are arranged in such a way that the output coupling mirrors are arranged along a common output coupling column running transversely with respect to the alignment of the primary sections of the resonator axes. In other words, the output coupling mirrors of laser units situated opposite at the output coupling row are arranged offset with respect to one another along the output coupling row. Such an arrangement of the output coupling mirrors enables a simple increase in the number of laser units with at same time a small distance between the output coupling mirrors. The output coupling column may run perpendicularly to the alignment of the primary sections of the resonator axes and to the output coupling row.

In accordance with at least one embodiment, the optoelectronic semiconductor laser component has a semiconductor layer sequence, in which the laser units are embodied. All the laser units may be embodied in a single common semiconductor layer sequence. The semiconductor laser component is embodied in particular in monolithic fashion. A monolithic semiconductor component is distinguished in particular by the fact that all the semiconductor layers are grown epitaxially one on top of another. In such a semiconductor laser component, particularly small distances between the laser units are advantageously possible.

In accordance with at least one embodiment, the optoelectronic semiconductor laser component has a semiconductor layer sequence comprising a first semiconductor region of a p conduction type, a second semiconductor region of an n conduction type and an active region. The active region is arranged between the first and second semiconductor regions and is configured for emitting the electromagnetic radiation. In an non-limiting embodiment, the active region comprises a pn junction, a double heterostructure, a single quantum well (SQW) structure or a multiquantum well (MQW) structure for generating radiation. The first semiconductor region and the second semiconductor region serve for example as cladding layers around the active region and therefore may have a lower refractive index than the active region. As a result, it is possible to achieve better guidance of the electromagnetic radiation in the active region.

The first semiconductor region is arranged on the opposite side of the semiconductor laser component with respect to the output coupling surface. Advantageously, therefore, the first semiconductor region having a p conduction type is a mounting side of the semiconductor laser component. Consequently, simplified electrical driving of the semiconductor laser component is possible, for example.

In accordance with at least one embodiment of the optoelectronic semiconductor laser component, the first semiconductor region of all the laser units is provided for connection to a common electrical reference potential. In other words, the first semiconductor regions of all the laser units are connected to the same electrical reference potential. The common anode thus formed enables for example driving of the individual cathodes of the laser units by means of an n-channel field effect transistor. Advantageously, particularly efficient electrical driving of the individual laser units is thus possible.

In accordance with at least one embodiment of the optoelectronic semiconductor laser component, the semiconductor layer sequence is free of a growth substrate. In other words, the semiconductor laser component is a thin-film semiconductor component. Such a component enables particularly good heat dissipation and thus particularly efficient operation. Furthermore, in particular electrical resistances as a result of a growth substrate are avoided.

In accordance with at least one embodiment of the optoelectronic semiconductor laser component, a distance between the output coupling mirrors of two laser units in a direction parallel to the primary sections of the resonator axes is at most 50 μm, such as at most 20 μm, or at most 1 μm. A particularly small distance between the output coupling mirrors enables simple superimposition of the emissions of a plurality of laser units.

In accordance with at least one embodiment of the optoelectronic semiconductor laser component, the output coupling mirror is provided with an antireflection coating. The antireflection coating increases in particular the radiation transmittivity of the output coupling mirror for the electromagnetic radiation generated in the laser unit during operation. Advantageously, the antireflection coating thus reduces the reflectivity of the output coupling mirror and thus increases the output coupling efficiency of the output coupling mirror.

In accordance with at least one embodiment of the optoelectronic semiconductor laser component, each laser unit has a plurality of contact strips, such as at least eight, or at least 16, contact strips. In an non-limiting embodiment, each contact strip is drivable independently of the other contact strips. The contact strips are aligned for example parallel to one another along the primary section of the resonator axis. In particular, during operation of a laser unit, in each case only a portion of the contact strips is used for energizing the active region. An arrangement of a plurality of contact strips enables finer driving of the laser unit and thus a particularly large brightness dynamic range of the laser unit.

Furthermore, an optoelectronic arrangement is specified. The optoelectronic arrangement has in particular an optoelectronic semiconductor laser component described here. That is to say that all the features disclosed in association with the optoelectronic semiconductor laser component are also disclosed for the optoelectronic arrangement, and vice versa.

In accordance with at least one embodiment of the optoelectronic arrangement, the optoelectronic arrangement has at least two optoelectronic semiconductor laser components in accordance with any of the preceding embodiments, wherein the output coupling surfaces of the semiconductor laser components are aligned parallel to one another. In a non-limiting embodiment, the output coupling surfaces of the semiconductor laser components are arranged in a common plane. The electromagnetic radiation emitted by the semiconductor laser components is coupled into a common waveguide. Different semiconductor laser components are configured for emitting electromagnetic radiation of different peak wavelengths.

By way of example, each laser unit of a semiconductor laser component corresponds to an emitter of a multicolored pixel. In particular a movable deflection optical unit is disposed downstream of the waveguide in order to realize a projection device. By means of the deflection optical unit, the pixels of an image can be successively represented on a projection surface. By way of example, the optoelectronic arrangement comprises three semiconductor laser components, wherein a first semiconductor laser component is configured for emitting electromagnetic radiation in a red spectral range, a second semiconductor laser component is configured for emitting electromagnetic radiation in a green spectral range and a third semiconductor laser component is configured for emitting electromagnetic radiation in a blue spectral range. Pixels with a multiplicity of different colors can be represented by means of superimposition of the emissions of the three semiconductor laser components.

In accordance with at least one embodiment of the optoelectronic arrangement, an optical device for collimating the electromagnetic radiation emitted by the semiconductor laser components is arranged between the waveguide and a respective semiconductor laser component. By way of example, the optical device is a lens body. Collimated radiation can advantageously be coupled into the waveguide and superimposed therein in a particularly simple manner.

In accordance with at least one embodiment of the optoelectronic arrangement, the semiconductor laser components are arranged transversely with respect to a main direction of extent of the waveguide and the waveguide has deflection surfaces, each of which brings about a deflection of the transversely coupled-in electromagnetic radiation in a direction parallel to the main direction of extent of the waveguide. The deflection surfaces are formed with dichroic elements, for example, which in each case reflect only electromagnetic radiation of a specific wavelength and allow the other spectral components to be transmitted at least partly.

An optoelectronic semiconductor laser component described here is suitable in particular for use as a compact highly pixelated laser light source for scanning applications (laser beam scanner). Furthermore, an application for RGB lasers in augmented displays or virtual reality displays is also conceivable.

BRIEF DESCRIPTION OF THE DRAWINGS

Further advantages and advantageous configurations and developments of the optoelectronic semiconductor laser component will become apparent from the following exemplary embodiments, in association with those illustrated in the figures. In the figures:

FIGS. 6A and 6B show schematic views of an optoelectronic arrangement described here in accordance with a first exemplary embodiment.

Elements that are identical, of identical type or act identically are provided with the same reference signs in the figures. The figures and the size relationships of the elements illustrated in the figures among one another should not be regarded as to scale. Rather, individual elements may be illustrated with an exaggerated size in order to enable better illustration and/or in order to afford a better understanding.

DETAILED DESCRIPTION

Figure 1:
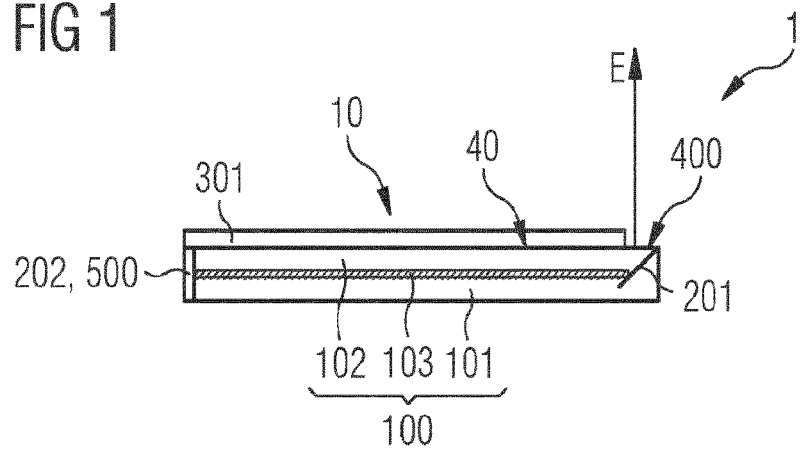
FIG. 1 shows a schematic sectional view of an optoelectronic semiconductor laser component described here in accordance with a first exemplary embodiment.

FIG. 1 shows an optoelectronic semiconductor laser component in accordance with a first exemplary embodiment. For reasons of enabling better illustration, the figures illustrate in part only a portion of the semiconductor laser components 1. The optoelectronic semiconductor laser component 1 comprises a semiconductor layer sequence 100 having a first semiconductor region 101 of a first conduction type, a second semiconductor region 102 of a second conduction type and an active region 103. Furthermore, the semiconductor laser component 1 has a output coupling surface 40, through which electromagnetic radiation E generated in the semiconductor laser component 1 during operation is coupled out at least regionally. The output coupling surface 40 is a main surface of the semiconductor laser component 1 and is embodied in planar fashion.

The active region 103 is arranged between the first semiconductor region 101 and the second semiconductor region 102 and is provided for emitting the electromagnetic radiation E. Furthermore, a first resonator mirror 201 and a second resonator mirror 202 are integrated in the semiconductor layer sequence 100. The second resonator mirror 202 is arranged at an end surface of the semiconductor laser component 1 and is an end mirror 500.

The output coupling of the electromagnetic radiation E in the direction of the output coupling surface 40 is effected by means of an output coupling mirror 400. The output coupling is effected in a vertical direction and thus transversely, in particular perpendicularly, with respect to the main plane of extent of the semiconductor laser component 1. A contact strip 301 is arranged on the output coupling surface 40 along the active region 103. The active region 103 is electrically connected by means of the contact strip 301 and a further electrical contact surface 302, not illustrated in FIG. 1, on an opposite side of the semiconductor layer sequence 100 with respect to the contact strip 103.

Figure 2A:
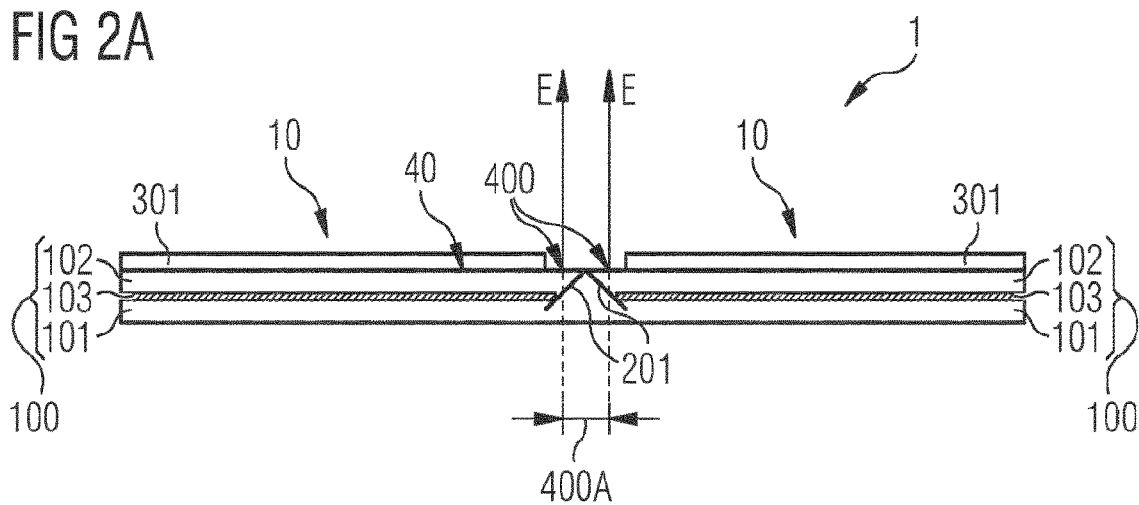
FIGS. 2A and 2B show schematic views of an optoelectronic semiconductor laser component described here in accordance with a second exemplary embodiment.

FIG. 2A shows a schematic sectional view of an optoelectronic semiconductor laser component 1 described here in accordance with the second exemplary embodiment. In accordance with the exemplary embodiment illustrated here, the optoelectronic semiconductor laser component 1 comprises two laser units 10 opposite one another. The output coupling mirrors 400 and the first resonator mirrors 201 of the opposite laser units 10 face one another. In relation to a common axis which runs laterally and along which the output coupling mirrors 400 are arranged, the laser units 10 are arranged in such a way that the output coupling mirrors 400 are each arranged nearer to the axis than the second resonator mirrors 202 of the laser units. The emission of electromagnetic radiation E from the output coupling mirrors 400 thus advantageously takes place at a particularly small distance 400A from one another.

Figure 2B:
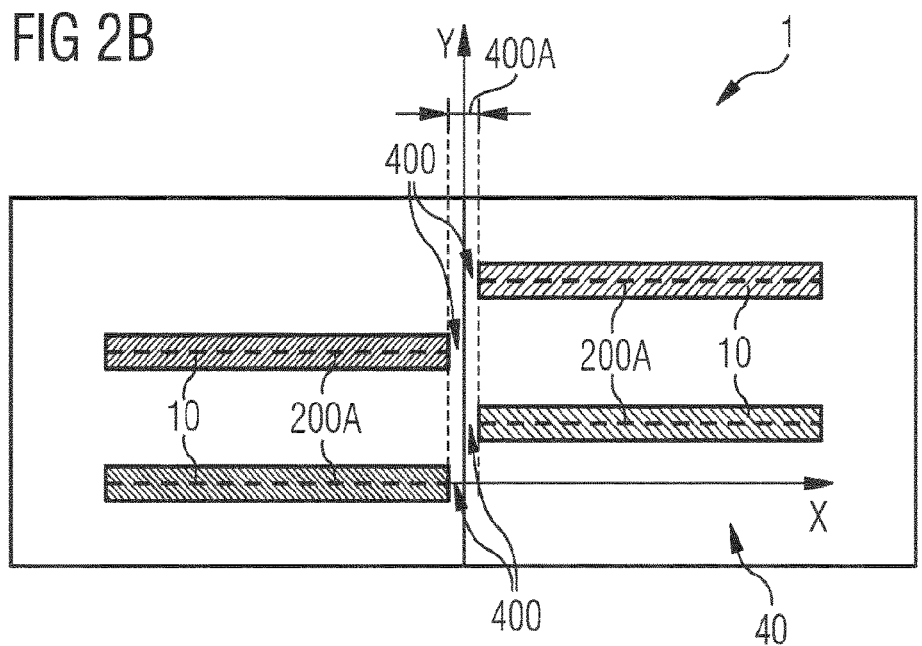

FIG. 2B shows a schematic plan view of a semiconductor laser component 1 in accordance with the second exemplary embodiment. The lateral arrangement of the individual laser units 10 is discernible in this plan view. The laser units 10 are arranged in such a way that the primary sections of the resonator axes 200A of the laser units 10 are aligned parallel to one another in the direction of an output coupling row X and the output coupling mirrors 400 face one another. The output coupling mirrors 400 are arranged offset with respect to one another along a common output coupling column Y running perpendicularly to the alignment of the primary sections of the resonator axes 200A. The distance between the output coupling mirrors 400A in the direction of the output coupling row X is less than 10 µm. Laser units 10 arranged in this way are suitable in particular for attaining an increased optical resolution during the application as a light source for a projection device.

Figure 3:
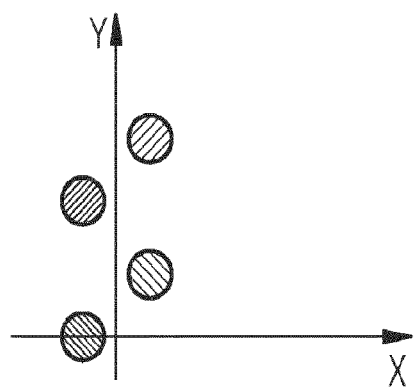
FIG. 3 shows a schematic view of an emission characteristic of an optoelectronic semiconductor laser component in accordance with the second exemplary embodiment.

FIG. 3 shows a schematic view of an emission characteristic of the optoelectronic semiconductor laser component 1 in accordance with the second exemplary embodiment. The emission characteristic illustrated here shows the small distances between the electromagnetic radiation emitted by the laser units 10 in the direction of the output coupling column Y and the output coupling row X. In the case where a downstream deflection optical unit is used, the offset of the beams in the direction of the output coupling row X can be compensated for by means of the laser units 10 being driven with a temporal offset, such that for example all emissions take place one above another in an output coupling column Y.

Figure 4:
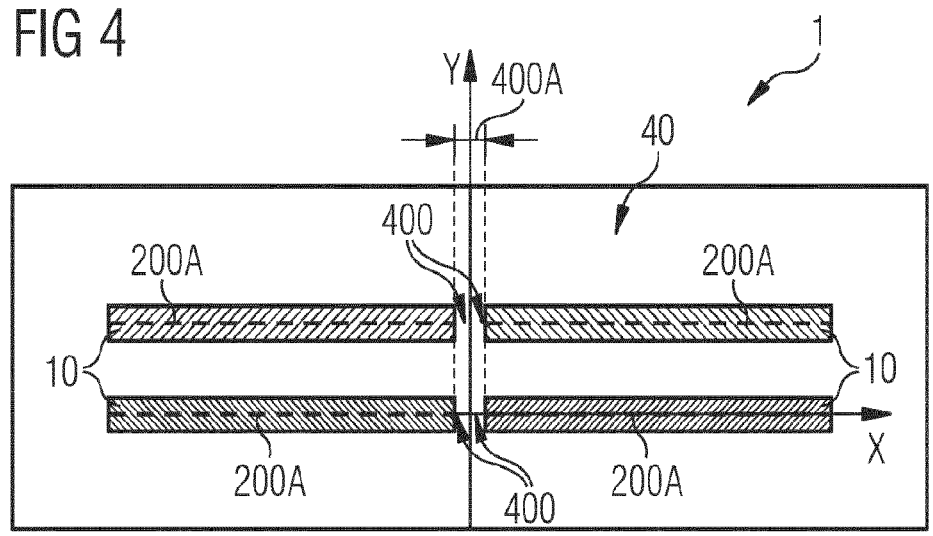
FIG. 4 shows a schematic view of an optoelectronic semiconductor laser component described here in accordance with a third exemplary embodiment.

FIG. 4 shows a schematic plan view of an optoelectronic semiconductor laser component 1 in accordance with the third exemplary embodiment. In terms of its cross section the third exemplary embodiment corresponds to the second exemplary embodiment shown in FIG. 2A.

In the third exemplary embodiment of an optoelectronic semiconductor laser component 1, the laser units 10 are arranged in such a way that the primary sections of the resonator axes 200A of in each two laser units 10 opposite one another lie in a common output coupling row X. The output coupling mirrors 400 of the laser units 10 are aligned with one another in the direction of the output coupling column Y. Laser units 10 arranged in this way are suitable in particular for attaining an increased brightness of individual pixels during the application as a light source for a projection device.

Figure 5:
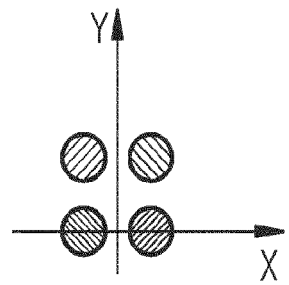
FIG. 5 shows a schematic view of an emission characteristic of an optoelectronic semiconductor laser component in accordance with the third exemplary embodiment.

FIG. 5 shows a schematic view of an emission characteristic of an optoelectronic semiconductor laser component in accordance with the third exemplary embodiment. In the case where a downstream deflection optical unit is used, the offset of the beams in the direction of the output coupling row X can be compensated for by means of the laser units 10 being driven with a temporal offset, such that in each case the emissions of two laser units 10 are superimposed in an output coupling column Y.

FIG. 6A shows a schematic sectional view of an optoelectronic arrangement 2 described here in accordance with a first exemplary embodiment. Three optoelectronic semiconductor laser components 1 are arranged along a main direction of extent of a waveguide 20. The optoelectronic semiconductor laser components 1 each have four laser units 10 with an active region 103. Each semiconductor laser component 1 comprises four laser units 10 and is configured for emitting electromagnetic radiation E of a different peak wavelength. The laser units 10 within a semiconductor laser component 1 are configured for emitting electromagnetic radiation of the same peak wavelength.

One optoelectronic semiconductor laser component 1 is configured for emitting electromagnetic radiation E in the blue spectral range, one optoelectronic semiconductor laser component 1 is configured for emitting electromagnetic radiation E in the green spectral range and one optoelectronic semiconductor laser component 1 is configured for emitting electromagnetic radiation E in the red spectral range.

The electromagnetic radiation E of each of the optoelectronic semiconductor laser components 1 is coupled into the waveguide 20 by means of an optical device 30 transversely with respect to the main direction of extent of the waveguide 20. The waveguide 20 comprises deflection surfaces 21 configured for deflecting the coupled-in electromagnetic radiation in a direction parallel to the main direction of extent of the waveguide 20.

The deflection surfaces 21 are formed with dichroitic elements, which in each case reflect only the electromagnetic radiation of a specific wavelength and allow the other spectral components to be transmitted at least partly. The electromagnetic radiation emitted by the optoelectronic semiconductor laser components 1 is thus superimposed in the waveguide 20.

By way of example, a deflection optical unit, not illustrated here, is disposed downstream of the optoelectronic arrangement 2, and projects the electromagnetic radiation emerging from the waveguide 20 onto a projection surface.

FIG. 6B shows a schematic plan view of an optoelectronic arrangement 2 in accordance with the first exemplary embodiment. The lateral positioning of the individual optoelectronic semiconductor laser components 1 and also of the laser units 10 contained can be seen in this exemplary embodiment. Each of the laser units 10 constitutes an emitter of a pixel. In the waveguide 20, the emissions of the individual laser units 10 of the semiconductor laser components 1 are superimposed to form colored pixels, whereby a representation of a total of four colored pixels is made possible.

Figure 7A:
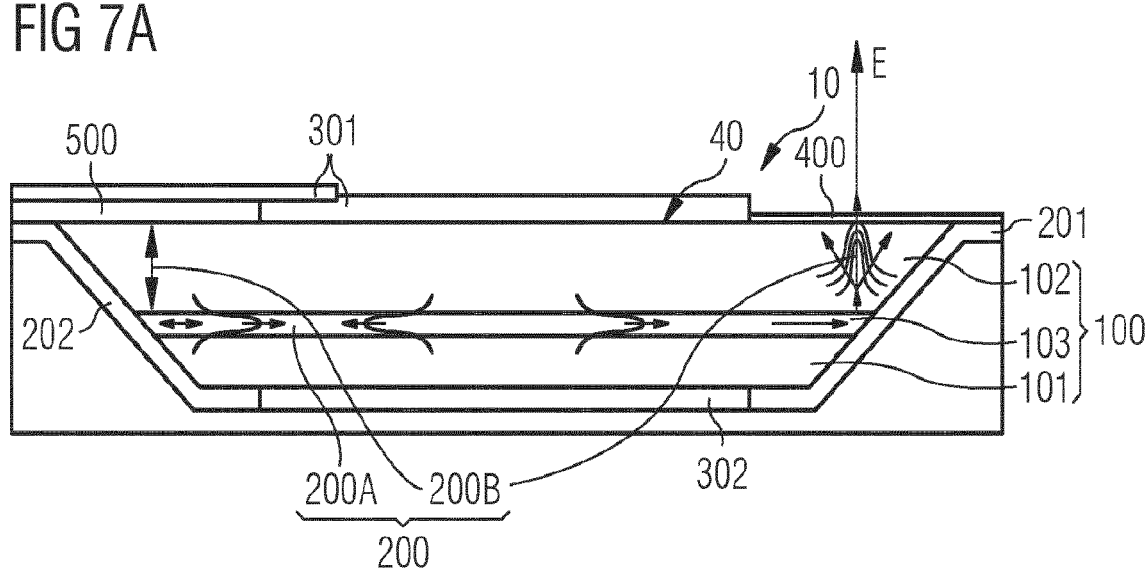
FIGS. 7A and 7B show schematic views of a laser unit described here in accordance with a first exemplary embodiment.

FIG. 7A shows a schematic sectional view of a laser unit 10 described here in accordance with a first exemplary embodiment. The laser unit 10 has a semiconductor layer sequence 100 with an output coupling surface 40. The semiconductor layer sequence 100 comprises a first semiconductor region 101 of a p-conduction type, a second semiconductor region 102 of an n conduction type and an active region 103 arranged between the first semiconductor region 101 and the second semiconductor region 102. The active region 103 comprises a pn junction configured for emitting electromagnetic radiation.

The first semiconductor region 101 and the second semiconductor region 102 each have a lower refractive index than the active region 103.

The laser unit 10 comprises a laser resonator between an end mirror 500 and an output coupling mirror 400. Both the end mirror 500 and the output coupling mirror 400 are arranged on the output coupling surface. The end mirror 500 is formed by a distributed Bragg reflector (DBR). The end mirror 500 has a reflectivity of 99%. The output coupling mirror is formed by a partial region of the output coupling surface 40. The output coupling mirror has a reflectivity of 95%.

Electromagnetic radiation generated in the active region 103 may propagate within the active region 103 along a resonator axis 200. The resonator axis 200 runs between the end mirror 500 and the output coupling mirror 400 and has a primary section 200A and two secondary sections 200B. The primary section 200A is situated between a first resonator mirror 201 and a second resonator mirror 202, which are embodied in the semiconductor layer sequence 100.

One secondary section of the resonator axis 200B is situated between the first resonator mirror 201 and the output coupling mirror 400. A further secondary section of the resonator axis 200B is situated between the second resonator mirror 202 and the end mirror 500.

The first resonator mirror 201 and the second resonator mirror 202 have an orientation of 45° with respect to the primary section of the resonator axis 200A. In a non-limiting embodiment, a deflection of the electromagnetic radiation at the resonator mirrors 201, 202 by means of total internal reflection thus takes place.

The emission of electromagnetic radiation E from the semiconductor laser component 1 predominantly takes place through the output coupling mirror 400. At least one contact strip 301 is arranged on the output coupling surface 40. Furthermore, a further electrical contact surface 302 is arranged on the opposite side of the semiconductor layer sequence 100 with respect to the output coupling surface 40, and is provided for the electrical driving of the active region 103.

The contact strip 301 extends across the end mirror 500 and at least partly covers the end mirror 500.

Figure 7B:
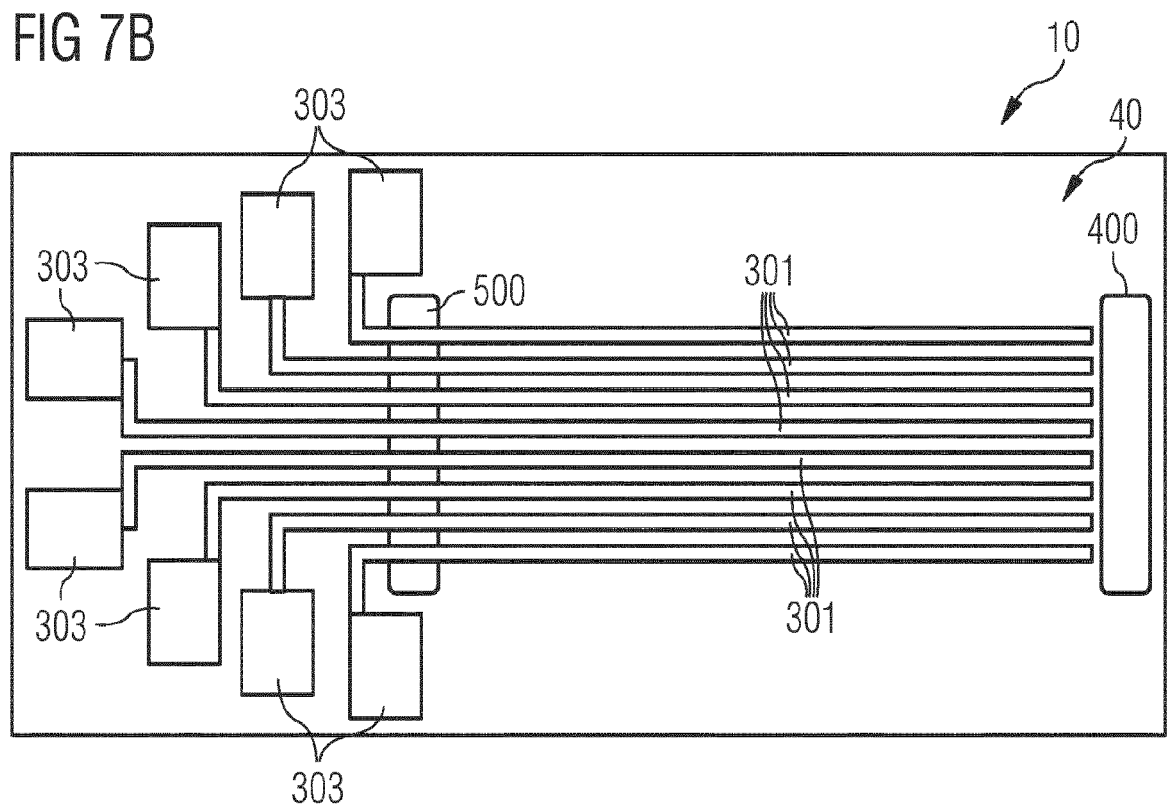

FIG. 7B shows a schematic plan view of a laser unit 10 described here in accordance with the first exemplary embodiment. The laser unit 10 has a plurality of contact strips 301, each of which is connected to a connection surface 303. The exemplary embodiment described here has eight contact strips 301 and eight respectively associated connection surfaces 303. Each contact strip 301 is individually drivable independently of the other contact strips 301 via a respective connection surface 303.

The contact strips 301 are aligned parallel to one another along the primary resonator axis 200A and extend in a lateral direction in each case across the end mirror 500. Virtually any desired spatial extent of the contact strips 301 and of the electrical connection surfaces 303 is thus made possible. A particularly fine setting of the brightness of the laser unit 10 is made possible by means of the plurality of contact strips 301. Furthermore, an increased brightness dynamic range is achievable in a simple manner by virtue of the multiplicity of contact strips 301.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or exemplary embodiments.

LIST OF REFERENCE SIGNS 1 optoelectronic semiconductor laser component
2 optoelectronic arrangement
10 laser unit
20 waveguide
21 deflection surface
30 optical device
40 output coupling surface
100 semiconductor layer sequence
101 first semiconductor region
102 second semiconductor region
103 active region
200 resonator axis
200A primary section of the resonator axis
200B secondary sections of the resonator axis
201 first resonator mirror
202 second resonator mirror
301 contact strip
302 electrical contact surface
303 connection surface
400 output coupling mirror
400A distance between the output coupling mirrors
500 end mirror
E electromagnetic radiation
X output coupling row
Y output coupling column

The invention claimed is:

1. An optoelectronic semiconductor laser component comprising at least two laser units;
wherein:
the semiconductor laser component has an output coupling surface configured to at least regionally couple out electromagnetic radiation generated in the semiconductor laser component;
each laser unit comprises a laser resonator having a resonator axis, an output coupling mirror and a first resonator mirror and a second resonator mirror;
wherein a primary section of the resonator axis runs laterally between the first resonator mirror and the second resonator mirror, and a secondary section of the resonator axis runs vertically between the first resonator mirror and the output coupling mirror;
wherein the output coupling mirror is formed by a partial region of the output coupling surface;
wherein each laser unit further comprises a contact strip arranged on the output coupling surface along the primary section of the resonator axis, the contact strip extending to a metallic connection surface;
wherein each laser unit further comprises a horizontal end mirror over the output coupling surface,
wherein the second resonator mirror is a deflection mirror and a further secondary section of the resonator axis runs between the second resonator mirror and the horizontal end mirror,
wherein the contact strip extends over the horizontal end mirror to the metallic connection surface, and
wherein the at least two laser units are aligned in such a way that the primary sections of the resonator axes run parallel to one another and the output coupling mirrors face one another.

2. The optoelectronic semiconductor laser component as claimed in claim 1,
wherein at least one of the laser units comprises a plurality of contact strips and all of the contact strips extend over the horizontal end mirror.

3. The optoelectronic semiconductor laser component as claimed in claim 1,
wherein the horizontal end mirror comprises a multilayered, dielectric mirror.

4. The optoelectronic semiconductor laser component as claimed in claim 1,
wherein each of the first resonator mirror and the second resonator mirror have an alignment with the primary section of the resonator axis which enables a total internal reflection of the electromagnetic radiation amplified in the resonator in the direction of the output coupling surface.

5. The optoelectronic semiconductor laser component as claimed in claim 1,
wherein each laser unit of the at least two laser units is arranged in such a way that the primary sections of their resonator axes lie on a common output coupling row.

6. The optoelectronic semiconductor laser component as claimed in claim 1,
wherein the at least two laser units are arranged in such a way that the output coupling mirrors are arranged along a common output coupling column running transversely with respect to the alignment of the primary sections of the resonator axes.

7. The optoelectronic semiconductor laser component as claimed in claim 1,
further comprising a semiconductor layer sequence, wherein the at least two laser units are embodied.

8. The optoelectronic semiconductor laser component as claimed in claim 7,
wherein the semiconductor layer sequence comprises:
a first semiconductor region of a p conduction type;
a second semiconductor region of an n conduction type; and
an active region arranged between the first semiconductor region and the second semiconductor region; wherein the active region is configured to emit the electromagnetic radiation; and wherein the first semiconductor region is arranged on the side of the semiconductor laser component facing away from the output coupling surface.

9. The optoelectronic semiconductor laser component as claimed in claim 8, wherein the first semiconductor region of all of the at least two laser units is configured to connect to a common electrical reference potential.

10. The optoelectronic semiconductor laser component as claimed in claim 1,
wherein the semiconductor layer sequence is free of a growth substrate.

11. The optoelectronic semiconductor laser component as claimed in claim 1, wherein a distance between the output coupling mirrors of the at least two laser units in a direction parallel to the primary sections of the resonator axes is at most 50 µm.

12. The optoelectronic semiconductor laser component as claimed in claim 1,
wherein the output coupling mirror comprises an antireflection coating.

13. The optoelectronic semiconductor laser component as claimed in claim 2,
wherein each laser unit of the at least two laser units has at least eight contact strips.

14. An optoelectronic arrangement comprising at least two optoelectronic semiconductor laser components as claimed in claim 1,
wherein the output coupling surfaces of the at least two semiconductor laser components are aligned parallel to one another, wherein different semiconductor laser components are configured to emit electromagnetic radiation of different wavelengths, and wherein the electromagnetic radiation emitted by the at least two semiconductor laser components is coupled into a common waveguide.

15. The optoelectronic arrangement as claimed in claim 14, further comprising an optical device configured to collimate the electromagnetic radiation emitted by the semiconductor laser components; wherein the optical device is arranged between the waveguide and a respective semiconductor laser component.

16. The optoelectronic arrangement as claimed in claim 14, wherein the at least two semiconductor laser components are arranged transversely with respect to a main direction of extent of the waveguide and the waveguide has deflection surfaces, each of which brings about a deflection of the transversely coupled-in electromagnetic radiation in a direction parallel to the main direction of extent of the waveguide.

17. The optoelectronic semiconductor laser component as claimed in claim 1, wherein a distance between the output coupling mirrors of the at least two laser units in a direction parallel to the primary sections of the resonator axes is at most 20 µm.

18. The optoelectronic semiconductor laser component as claimed in claim 1, wherein a distance between the output coupling mirrors of the at least two laser units in a direction parallel to the primary sections of the resonator axes is at most 1 µm.

19. The optoelectronic semiconductor laser component as claimed in claim 4, wherein each laser unit of the at least two laser units has at least 16 contact strips.

* * * * *